Patented Dec. 14, 1948

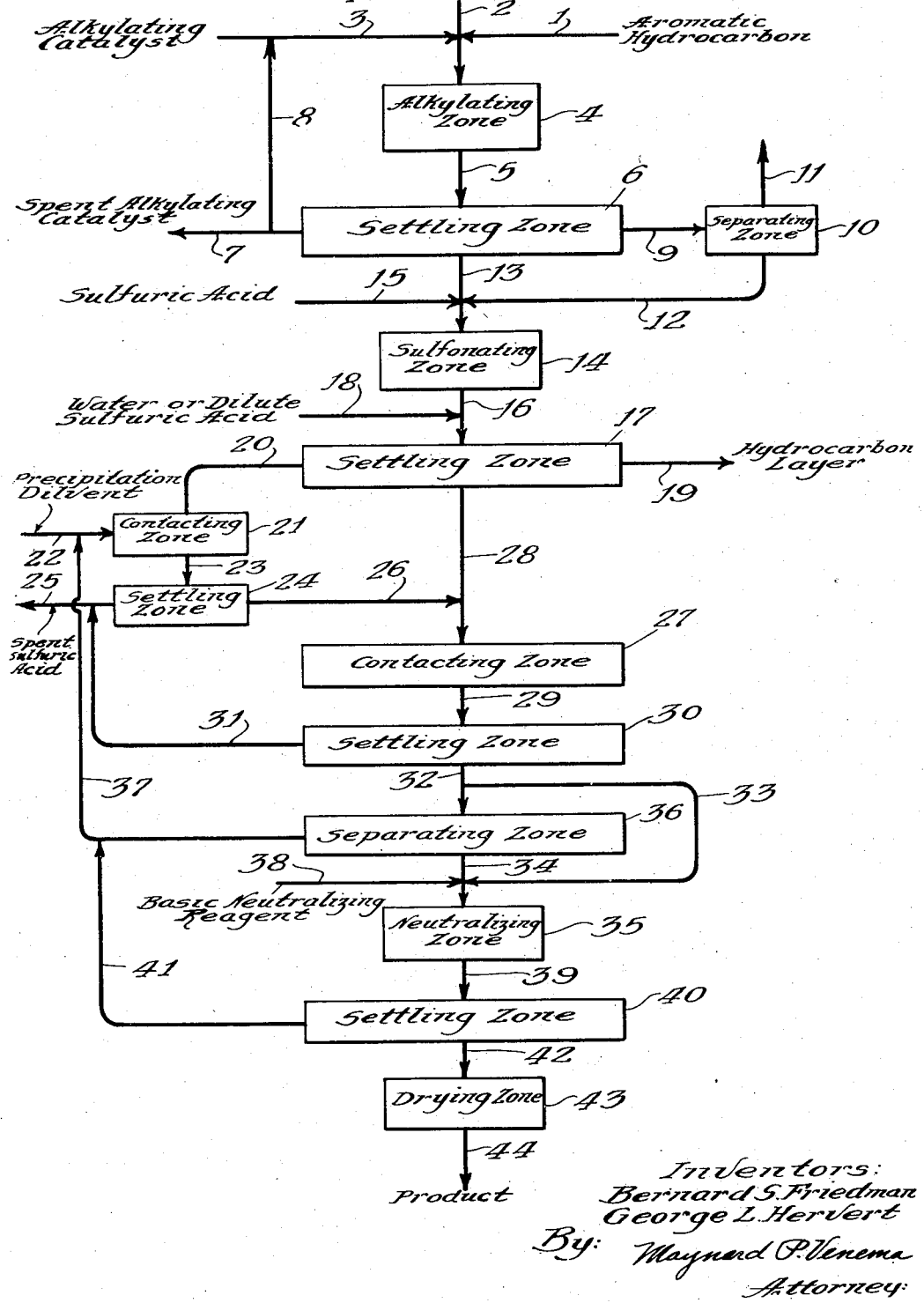

2,456,119

UNITED STATES PATENT OFFICE 2,456,119

PRODUCTION OF SURFACE ACTIVE AGENTS

Bernard S. Friedman, Chicago, and George L. Hervert, Berwyn, Ill., assignors to Universal Oil Products Company, Chicago, Ill., a corporation of Delaware Application October 25, 1945, Serial No. 624,562

15 Claims. (Cl. 260—505)

This invention relates to the production of improved alkyl aromatic sulfonates which are useful as surface active agents in deterging, wetting, penetrating, emulsifying and like processes. More particularly, this invention concerns the treatment of a hydrocarbon charging stock utilized in the preparation of the said surface active agents and/or the treatment of an intermediate alkylation product employed in said preparation to remove undesirable components therefrom, producing thereby a more select and improved starting material.

In the present invention a process is described for manufacturing aromatic sulfonates having one or more alkyl groups attached to the aromatic nucleus, said sulfonates yielding aqueous solutions having a high degree of surface activity and especially useful for purposes in which soap is now employed. Furthermore, the present surface active agents are not converted in any appreciable degree into inactive precipitates by reaction with calcium and magnesium ions in aqueous solution, so that the present sulfonates may be dissolved in so-called "hard" water without substantially affecting their surface activity; this property is in contrast to the precipitation of inactive and otherwise undesirable calcium and magnesium soap curds when ordinary soap is added to hard water. Further, the alkyl aromatic sulfonates comprising this invention, have utility in sizing, dyeing, and tanning operations, where the sulfonates act to lower the surface tension of the water in which they are dissolved and therefore enhance the penetrability of such solutions.

According to the present invention, the alkyl aromatic sulfonates comprising the surface active agents herein referred to are prepared by a combined process of alkylation and sulfonation. In said alkylation step, a fraction containing olefinic hydrocarbons of at least 10 and not more than 16 carbon atoms per molecule which may be selectively treated to remove undesirable components therefrom as hereinafter disclosed is condensed with an aromatic hydrocarbon of the benzene series to form an alkyl aromatic hydrocarbon or a mixture of the same with homologs of the aromatic hydrocarbons. Sulfonation of the resultant hydrocarbon is effected by contacting the alkylation product with an active sulfonating reagent. The sulfonic acid separated from the reaction mixture may be utilized as a free acid or is preferably reacted with a basic reagent to form a sulfonate salt which comprises the present surface active agent.

It is one object of this invention to provide a process for producing surface active agents useful for deterging, wetting, and other purposes.

It is another object of this invention to provide a process for alkylating a benzene hydrocarbon with an olefinic hydrocarbon derived from a select fraction of a thermally cracked or reformed crude oil distillate, sulfonating the alkylate and reacting the resultant sulfonic acid with a basic reagent to form a surface active sulfonate salt.

A further object of this invention is to provide a means for removing condensed-ring aromatic hydrocarbons and nitrogen- and sulfur-containing impurities from a select olefinic hydrocarbon stock or from the alkylation product of said olefinic hydrocarbon stock with a benzene hydrocarbon, thereby separating undesirable components from said hydrocarbons for the purpose of preparing the improved surface active agent comprising this invention.

In one embodiment this invention comprises a method for producing a surface active agent by alkylating a benzene hydrocarbon with an olefinic hydrocarbon fraction boiling in the approximate range of from about 160° to about 240° C., which has previously been subjected to solvent extraction for the removal of condensed-ring aromatic hydrocarbons and nitrogen- and sulfur-containing compounds therefrom, sulfonating the desired alkylate, and converting the resulting sulfonic acid to the surface active agent of this invention.

A specific embodiment of this invention relates to a process which comprises a solvent extraction step or selective treating step for removing condensed-ring aromatic hydrocarbons and sulfur- and nitrogen-containing compounds from a naphtha fraction of a cracked petroleum distillate boiling within the range of from about 175° to about 220° C., alkylating toluene with said solvent-extracted or treated naphtha fraction, separating from the resultant alkylate a distillate boiling from about 265° to about 350° C., sulfonating said distillate, reacting the sulfonic acid so produced with a basic reagent until said reaction mixture is neutral, and separating an alkyl aromatic sulfonate salt comprising the improved detergent of this invention.

A more specific embodiment of this invention comprises extracting a naphtha fraction of a cracked petroleum distillate which contains olefinic hydrocarbons having from about 10 to about 16 carbon atoms per molecule with an aqueous solution of methylcellosolve (monomethyl ether of ethylene-glycol) until the aromatic content of said naphtha fraction is reduced to a low predetermined value, contacting the purified naphtha fraction with a molar excess of toluene in the presence of an alkylation catalyst and at alkylating conditions to effect condensation of at least a portion of said toluene with said olefinic hydrocarbons contained in the naphtha fraction, separating a desirable portion of said alkylate, contacting said portion with sulfuric acid at sulfonating conditions, separating a desirable sulfonic acid and neutralizing said acid to yield a sulfonate salt possessing highly effective detersive properties.

Still another more specific embodiment relates to the selective treatment, either by fractionation by solvent extraction, or by treatment with an adsorption agent, of the alkylation product formed by contacting a naphtha fraction of a cracked petroleum distillate boiling within the range of from about 160° to about 240° C., with a benzene hydrocarbon at alkylating conditions and in the presence of an alkylation catalyst, to remove from said alkylate undesirable condensed-ring aromatic hydrocarbons and nitrogen- and sulfur-containing compounds for the production of improved surface active agents.

Other specific embodiments of this invention will hereinafter be developed in greater detail and will be evident from the description of this invention.

We have found, according to this invention, that very effective and highly efficient surface active agents, and particularly detergents, may be prepared by sulfonating the condensation product of benzene or its homologs with olefinic hydrocarbons containing from about 10 to about 16 carbon atoms per molecule. We have found, further, that such olefinic hydrocarbons may be derived from suitably boiling naphtha fractions of thermally cracked petroleum distillates and that improved detergents may be prepared by selectively purifying said olefinic fractions or the alkylation product derived from the condensation of the olefinic fraction with a benzene derivative wherein said alkylation product comprises an intermediate in the preparation of the present surface active agents.

As is well known in the art, certain fractions, particularly naphtha boiling range distillates obtained from thermally cracked petroleum oils, are mixtures of various types of hydrocarbons varying in the degree of their unsaturation. Depending upon the source of the original petroleum and the conditions maintained during the thermal cracking operation, the naphtha obtained therefrom may contain straight or branched chain olefins and cyclic olefins, as well as various types of aromatic hydrocarbons, including benzene and its homologs and condensed-ring aromatics such as naphthalene, tetralin, etc. and their alkyl derivatives. Also contained in the naphtha fraction of a thermally cracked petroleum distillate may be organic compounds containing nitrogen or sulfur within the molecule, either as heterocyclic compounds or as amino or thio substituents. When detergents are prepared from naphtha fractions containing the various extraneous compounds such as the condensed-ring aromatic hydrocarbons and the sulfur- and nitrogen-containing derivatives, inferior detergents are obtained which are off-color (varying in shades from light tan to tan to brown) and of decreased effectiveness as detergents; and which possess properties that impart a slight stickiness or tackiness to objects coming in contact with the detergents or its aqueous solutions. The properties of stickiness or tackiness are retained by the objects coming in contact with such detergents even after the objects have been thoroughly rinsed and in some cases even after the object has been dried. It is embodied in this invention, and is indeed a feature of the present invention, to provide a process for producing detergents of white or nearly white color which possess a high degree of detersive efficiency and which comprise alkyl benzene sulfonates which are free of extraneous materials causing stickiness or tackiness of objects coming in contact therewith.

As hereinbefore set forth, the improved surface active agents are produced by condensing an aromatic hydrocarbon containing a benzenoid nucleus with a mono-olefinic hydrocarbon containing from about 10 to about 16 carbon atoms per molecule obtained from a selected portion of a naphtha boiling range fraction of a thermally cracked petroleum distillate, sulfonating the resulting alkylate, and neutralizing the sulfonic acid thus formed with a basic reagent to form a sulfonate salt. The aromatic hydrocarbons containing a benzenoid nucleus utilized as starting material for the process of this invention include benzene and mono- or poly-alkyl benzene hydrocarbons in which the alkyl group (or groups) contain less than 6 carbon atoms and which are preferably methyl groups when poly-alkyl benzenes are employed. Thus benzene itself, or toluene, xylene, ethylbenzene, methylethyl-benzene, propylbenzene, methylpropyl-benzene, butylbenzene, methylbutylbenzene, amylbenzene, or methylamylbenzene comprise particularly preferred charge stocks in this process. Preferably, no more than one of the alkyl groups should be of greater chain length than the methyl group, and when poly-alkyl benzenes are employed in the process, the remaining groups are preferably methyl radicals. The benzenoid hydrocarbon utilized as starting material in the present process may contain more than 1 alkyl group as substituents attached to the benzenoid nucleus, but generally speaking, it is preferred that no more than 3 positions should be so substituted and in any event no more than 4 positions of the benzene nucleus may be occupied by alkyl groups. That is, the aromatic hydrocarbons subjected to alkylation in the initial stage of this process contains a benzenoid nucleus having at least two replaceable nucleus hydrogen atoms.

The olefinic hydrocarbon employed for alkylating the aforesaid aromatic hydrocarbons comprise in general mono-olefinic hydrocarbons which are not cracked or cleaved into shorter chain length hydrocarbons under the conditions of the alkylation step. The mono-olefins are selected from those containing at least 10, but not more than 16 carbon atoms. When utilizing the olefinic mixtures obtained from a naphtha fraction of a thermally cracked petroleum distillate, we prefer that said naphtha fraction contain at least 30 per cent of olefins having 10 to 12 carbon atoms per molecule and not more than 20 per cent of olefins having more than 15 carbon atoms per molecule. Generally, these preferred fractions are selected on the basis of boiling point range, said olefinic fractions containing from 10 to 16 carbon atoms per molecule being included in the material boiling in the range of from about 160° to about 240° C. The preferred boiling range depends upon the particular aromatic hydrocarbon selected from alkylation with the above olefinic fraction. If benzene is selected as the hydrocarbon to be alkylated, the preferred boiling range of the naphtha employed for alkylation purposes is from about 180° to about 220° C. In the alkylation of toluene, a naphtha fraction boiling within the range of from about 175° to about 210° C. is preferred. In the case of xylene, to cite another typical example, the naphtha should preferably boil within the range of from about 165° to about 210° C. Generally speaking, when the longer alkyl side chain aromatic hydrocarbons are utilized in the alkylation, the lower boiling range olefinic fractions of the above specified range are preferred. The content of lower molecular weight olefins in the naphtha fraction is generally determined by the initial boiling point of the fraction, while the amount of higher molecular weight olefins contained in the fraction is determined by the end boiling point, refractive index, and specific gravity.

Instead of purifying the initial olefinic fraction prior to alkylation, it is also within the scope of the present invention to purify the alkylate formed by reacting the entire naphtha fraction with the aromatic hydrocarbon. In an alternative method of purifying the alkylate, a solvent extraction procedure, or more simply, a fractionation may be utilized to effect the separation of the desired alkylate from undesirable sulfur- and nitrogen-containing compounds, and condensed-ring aromatic hydrocarbons formed by the self-alkylation of the various aromatic hydrocarbons and olefinic hydrocarbons contained in the naphtha fraction originally charged. In said fractionation step for separating desirable from undesirable components, the separation is accomplished more efficiently and usually more economically than can be effected by the solvent extraction procedure. The fractions boiling within the preferred boiling range are removed and compared with fractions of similar boiling range containing none of the aforementioned undesirable components. As an aid in further determining the composition of such fractions, refractive index and specific gravity determinations may be made on the fractions and compared with samples of the desired compounds. Generally, the alkylates of little or no value for the preparation of detergents boil at considerably higher temperatures than the boiling range of the desired alkylates and thus may be readily separated therefrom by fractionation, whereas the undesirable components in the original naphtha fraction from azeotropic and constant-boiling mixtures with the desirable olefinic components which are not readily separated by fractionation means.

The condensed-ring aromatic compounds removed from the hydrocarbon fractions utilized in the preparation of detergents are considered as by-products of the principal process and may be employed in the preparation of surface active agents for uses in which color and detersive efficiency is of lesser importance. Other uses for these by-products are for lubricating oil additives, where components of this nature have been shown to be useful for decreasing the viscosity of lubricating oils at low temperatures and for other uses in which unmodified oils become viscous or otherwise useless. When the combined properties of refractive index and specific gravity are relied upon to indicate the completeness of separation and the content of individual hydrocarbons contained in the particular fractions separated by said fractionation, the desired fraction is removed, compared with a fraction of the preferred composition and subsequently sulfonated.

When it is desired to treat the olefinic hydrocarbon fraction boiling in the naphtha range (from about 160° to about 240° C.) to remove undesirable constituents therefrom prior to alkylation, a solvent extraction procedure may be employed, or said naphtha fraction may be given a selective adsorption treatment wherein either the desired olefinic hydrocarbons or the undesirable components are selectively adsorbed from the fraction and removed. We have found that certain organic solvents are particularly effective for accomplishing the separation of undesirable components from the preferred olefinic hydrocarbons. Among such solvents and extraction agents we have found that the nitroparaffins of low molecular weight, generally not exceeding those of $C_6$ to $C_8$ chain length, organic acids, such as acetic and propionic acids, various ethers, such as the cellosolve compounds (methyl, ethyl, propyl, and butyl ethers of ethylene glycol), the carbitols or mixed alcohol-ether compounds such as methyl carbitol (mono-methyl ether of diethylene glycol) and diethylene glycol ethers of higher alcohols up to butyl alcohol, the aminoalcohols, such as ethanol- or diethanolamine and the alcohols, either saturated or unsaturated, preferably containing from about 5 to about 10 carbon atoms per molecule such as dipropylene glycol, hexanol, octanol, etc. are particularly preferred solvents or extraction agents. Of the general groups listed above, the nitroparaffins, the carbitols, the cellosolve compounds, glycols and the aminoalcohols are the preferred extraction agents, since these solvents, with or without added water, are generally immiscible with the hydrocarbon layer and remove aromatic hydrocarbons, particularly condensed-ring aromatic hydrocarbons, from said naphtha fraction. The immiscibility of the extraction agent and the hydrocarbons makes it possible to readily separate the raffinate and extract layers, thus resulting in a more efficient extraction process. The latter solvents also boil at sufficiently high temperature to be readily separable by distillation from the hydrocarbon layer if the extraction agent and hydrocarbon are miscible to any extent. In contrast to the preferred solvents, the recovery of the alcohols, and organic acid solvents from the raffinate and extract layers would require that each of the layers be washed with a secondary solvent such as water, followed by reconcentration of the primary from the secondary solvent.

The solvent extraction procedure of the type employed in the present invention is usually operated by contacting the olefinic hydrocarbon fraction with the solvent, usually continuously by countercurrent flow, until the olefinic hydrocarbon layer is sufficiently purified of the extraneous components, indicated by refractive index, specific gravity and bromine number determinations on the resultant raffinate. The extract and raffinate layers may then be separately fractionated or washed with a secondary solvent to recover the primary solvent or further purify the hydrocarbon layer.

As one feature of the purification step of this process, the olefinic naphtha fraction may be treated with a selective adsorbent to remove the undesirable condensed-ring aromatic hydrocarbons from the remaining olefinic hydrocarbons. Of the various adsorbents utilizable in this method of purification, we prefer to employ a material which removes the extraneous aromatic hydrocarbons and nitrogen- and sulfur-containing compounds from the naphtha fraction in preference to the reverse process of removing olefinic hydrocarbons from said fraction. Silica, and particularly activated silica, has been found to act in this capacity. Usually the separation is obtained by allowing the naphtha fraction to flow over a bed of silica at a definite rate to obtain the proper period of contact between the adsorbent and the naphtha fraction. The process may involve a number of towers arranged in series or in parallel and means for periodic regeneration of the silica. The latter regeneration may usually be effected by washing the deactivated silica with water or with various solvents, or by heating the deactivated silica to drive-off the adsorbed material. The remaining olefinic hydrocarbons contained in the original naphtha fraction may then be washed, as for example, with water or aqueous solutions of various bases and acids to remove the nitrogen- and sulfur-containing impurities.

The improved method for the production of surface active agents to which this invention relates involves the alkylation of an aromatic hydrocarbon of the benzene series with an olefinic hydrocarbon of the type above described in the presence of an alkylation catalyst. In the following further description of the invention, toluene has been selected as typical of the aromatic hydrocarbons containing a benzenoid nucleus capable of condensing with the olefinic hydrocarbons herein set forth to yield the desired alkylate. The alkylation mixture formed by the alkylation of toluene with the olefinic hydrocarbon will contain unconverted toluene, alkylated toluene, and spent alkylation catalyst, which mixture separates by settling into a hydrocarbon layer and a spent acid layer. It is preferable to separate the used catalyst layer from the alkylation mixture since the catalyst often contains dissolved therein highly colored materials which depreciate the quality of the finished product. The hydrocarbon layer separated from the alkylation catalyst contains largely toluene alkylate, but may also contain aromatic and olefinic hydrocarbons which are subsequently separated, as for example, by fractionation. The hydrocarbon layer may then be purified of undesirable impurities such as the aforementioned condensed-ring aromatic hydrocarbons and the nitrogen- and sulfur-containing compounds especially when the initial purification of the olefinic fraction was omitted. The purification of the alkylate may in some instances be the preferred method of operation, since the alkylate may generally be purified by the relatively simple method of fractionation. The purified alkyl aromatic hydrocarbons are then contacted with a sulfonating agent, generally sulfuric acid, at a temperature and for a period of time sufficient to convert the alkylated toluene hydrocarbons into the corresponding sulfonic acids, which are neutralized with an aqueous solution of a base, such as sodium hydroxide, to form an aqueous solution of the salts of alkyl toluene sulfonic acids. The solution may be then subjected to evaporation and drying by suitable means to form a detergent and wetting agent as herein set forth. Other sulfonating agents which are utilizable in our process include chlorosulfonic acid and mixtures of sulfuric acid and boron trifluoride, etc.

When sulfuric acid is employed as the alkylating catalyst, it is not always necessary to separate the used sulfuric acid from the mixture of alkylated toluene hydrocarbons formed thereby before these hydrocarbons are subjected to sulfonation. An additional quantity of sulfuric acid of greater strength if desired, and/or other sulfonating agent may be added directly to the alkylation mixture to effect sulfonation. Accompanying the changes in the sulfonating agent, the reaction conditions may also be altered, such as the temperature, to effect a more rapid and complete sulfonation. In an alternative process for the production of surface active agents, which comprises the preferred method of operating this process, the mixture of alkyl aromatic sulfonic acids and sulfuric acid formed in the sulfonating step of the general process as outlined above may be lowered in temperature by an intermediate cooling step, and treated with an extracting agent comprising a selective solvent for the alkyl aromatic sulfonic acid to remove from the mixture said sulfonic acid and obtain it in substantially pure form. The selective solvent is preferably contacted first with the sulfuric acid layer separated from the mixture to remove from said sulfuric acid layer the small amount of sulfonic acid usually dissolved therein. The solvent, containing in solution the sulfonic acid extracted from the sulfuric acid layer, is then contacted with the sulfonic acid layer to precipitate therefrom the sulfuric acid which ordinarily dissolves in said layer to some extent. The sulfonic acid is recovered from the extraction agent by relatively simple methods, as for example, by evaporation of the solvent from the mixture. Alternatively, the entire mixture of sulfonic acid and solvent may be removed to the neutralizing step of the present process without intermediate separation of the sulfonic acid from the solvent. However, by separating the sulfonic acid from the solvent and subjecting the purified alkyl aromatic sulfonic acid to a neutralization step and drying the resultant sulfonic acid salt, a product may be obtained containing only the desirable components in substantially pure condition. The selective solvent utilizable in the modified process for extracting the desired alkyl aromatic sulfonic acid may include organic compounds such as benzene, toluene, a kerosene fraction of a petroleum distillate, etc.

In the process as we have outlined it, usually a three layer system is formed in the settler following the sulfonation step. An upper layer consists primarily of unreacted alkyl aromatic hydrocarbons and any unalkylatable hydrocarbons contained in the charging stock. An intermediate layer formed in the settler following the sulfonation step contains the alkyl aromatic sulfonic acid mixed with some sulfuric acid. The bottom layer formed in the settler comprises substantially spent sulfuric acid which may be withdrawn continuously to the spent acid recovery plant or which is preferably given a prior extraction treatment to recover the sulfonic acids dissolved therein. The middle layer as above described which contains the desired sulfonic acid may also be withdrawn continuously when the process is operated on a continuous basis. In such a process of operation, the middle layer may be treated with a precipitation diluent to cause the formation of an aqueous sulfuric acid phase which is separated from the diluted aromatic sulfonic acid, or it may be mixed with a neutralizing agent to form an aqueous solution containing salts of sulfuric acid and of the various sulfonic acids. The latter operation, however, is not a preferred means of carrying out the process, since larger quantities of the relatively expensive neutralizing agent are required to form the relatively cheap inorganic sulfate salts. The uppermost hydrocarbon layer formed in the settler may be recycled in the process or washed and fractionated to separate desirable components for recycling or for other uses. If the layer contains alkyl aromatic hydrocarbons of the desired type, determined by their boiling points, etc., these may be recycled to the sulfonation stage to increase the overall yield of the process. The layer may further contain undesirable hydrocarbons or foreign organic compounds such as polyalkylated aromatics which resist sulfonation and certain saturated hydrocarbons formed either in the alkylation or sulfonation steps. These may be separated by fractionation and used as raw materials for the preparation of lubricating oil additives, surface active agents for uses in which color and detergency are not important factors, or for use as fuel oil, as desired.

The formation of the middle layer containing the desirable alkyl aromatic sulfonic acids with some sulfuric acid, may be facilitated by the careful addition of water or aqueous sulfuric acid thereto and is then preferably treated with a precipitation diluent to recover the sulfonic acid product. The precipitation diluent may, further, comprise the extracting agent utilized for removing the sulfonic acid usually dissolved in the sulfuric acid layer separated from the sulfonation reaction mixture as previously outlined. Thus, the precipitation diluent may be effectively utilized in first extracting the small amount of sulfonic acid contained in the sulfuric acid layer and subsequently utilized to precipitate the small amount of sulfuric acid contained in the sulfonic acid layer of the sulfonation product. The precipitation diluent so changes the solubility characteristics of the sulfonic acid in the mixed sulfonic acid-sulfuric acid phase that the contaminating aqueous sulfuric acid is rendered insoluble and forms a separate, lower layer. The separated sulfuric acid may be continuously removed from the settler and sent to the acid recovery unit as spent acid. The upper layer of sulfonic acid diluted with the precipitation diluent, as obtained in the acid settler, may then be heated to vaporize the precipitation diluent therefrom and the remaining sulfonic acid residue reacted with a basic reagent until neutral to form the sulfonate salt. Preferably, however, the solution of the precipitation diluent and sulfonic acid is contacted with a dilute aqueous solution of a neutralizing agent, such as a 10 per cent aqueous sodium hydroxide solution, to form the alkyl aromatic sulfonate salt. The sulfonate salt dissolves in the aqueous phase and separates as a distinct separable phase from the precipitation diluent. The aqueous sulfonate salt layer formed by reacting the solution of sulfonic acid in the precipitation diluent with the aqueous solution of basic reagent may be readily recovered without intermediate complications by separating said aqueous salt layer from the precipitation diluent, usually by simple decantation. In contrast to the latter method the evaporation of the precipitation diluent from the sulfonic acid involves a more complex series of steps, usually resulting in more pronounced deterioration of the sulfonic acid product at the temperatures required for the evaporation of the diluent. In the above preferred operation the aqueous phase is separated from the precipitation diluent in a secondary settler where it is withdrawn continuously and subjected first to partial distillation to recover solubilized precipitation diluent and then to a drying step involving the evaporation of water and removal of the product in the form of a dry salt comprising chiefly alkyl aromatic sulfonate. The precipitation diluent is preferably recycled in the process. The precipitation diluents utilizable in the present process in general includes organic liquids stable in the presence of sulfuric acid, such as the nonolefinic hydrocarbons or the saturated halogenated hydrocarbons preferably boiling below about 200° C. Of this group, it is preferred to employ a paraffinic or aromatic hydrocarbon, such as n-butane, n-pentane, hexane, benzene or a paraffin-containing fraction of a hydrocarbon oil, such as the naphtha fraction of a straight-run petroleum distillate. Other preferred precipitation diluents are the halogenated paraffins, such as chloroform, carbon tetrachloride, dichloroethane, etc.

Further, in carrying out our process, we have found that a neutralized layer is obtained which contains some of the inorganic salts of sulfuric acid as well as the salts of the desired alkyl aromatic sulfonic acid, and when this neutralized layer is evaporated to dryness and the dry material is extracted with a solvent such as methanol or ethanol or benzene, the desired sulfonate salt will be dissolved in the solvent solution, leaving a residue of inorganic reaction products. The solution of the sulfonate salt may then be treated in any manner suitable for removal of the solvent from the desired salt such as distillation with recovery and recycling of the solvent.

The solution of the alkyl aromatic sulfonate in the organic solvent may be treated further for the removal of coloring matter which may develop during the sulfonation stage and which, if left in the detergent, may detract from its physical appearance or otherwise reduce its desirability as a surface active agent. A suitable color-removing treatment may comprise contacting the solution of the sulfonate with activated charcoal, fuller's earth, kieselguhr, diatomaceous earth, or other insoluble adsorbent material, and filtering the mixture to separate the color-removing adsorbent. The decolorized solution may then be heated to evaporate the solvent and leave the sulfonate salt as a dried residue.

Likewise, the sulfonic acid layer dissolved in the precipitation diluent may be treated for the removal of coloring material mentioned above by contact with the aforementioned adsorbents, after which the sulfonic acids are neutralized and the salts separated from the diluent.

When sulfuric acid is employed as catalyst in the alkylation stage of the process, the operating temperature should be relatively low so as to minimize sulfonation therein of the aromatic hydrocarbon charged into the reaction. Whereas an equimolecular proportion of benzene and olefinic hydrocarbons theoretically react to form the alkyl aromatic hydrocarbon, it is generally preferable to employ a molar excess of the aromatic hydrocarbon to prevent di- or poly-alkylation of the aromatic hydrocarbon. An excess of the aromatic hydrocarbon of the order of about 20 mols to 1 mol of olefinic hydrocarbon may be required to minimize this effect, but generally a molar ratio of aromatic to olefinic hydrocarbons of about 4:1 or even as low as a 2:1 ratio is generally sufficient to eliminate substantially all poly-alkylation. The use of an excess of the benzenoid hydrocarbon in the alkylation step also reduces the factors of self-alkylation, which occurs when aromatic hydrocarbons are present in the naphtha fraction charged to the process. This practice thereby takes advantage of the "diluting" effect that the desirable benzenoid hydrocarbon has on the reaction mixture in effect reducing the proportion of undesirable aromatic hydrocarbons to desirable benzenoid hydrocarbons in the mixture. In general, the olefinic hydrocarbons and aromatic hydrocarbons are contacted with sulfuric acid of from about 90 to about 100 per cent concentration, usually at a temperature below about 30° C., and for a residence period of generally shorter than 90 minutes. The reaction conditions which we prefer to employ in effecting the desired alkylation comprise contacting said mixture of olefinic and aromatic hydrocarbons with sulfuric acid of about 93 to about 98 per cent concentration, at a temperature of from about 0° to about 10° C., and for a residence time of about 5 minutes to about 15 minutes. In this stage of the process, pressure is not a vitally important factor, other than its maintenance at a value sufficient to keep the reactants in substantially liquid phase throughout the alkylation reaction period. When employing the specified reaction temperatures, pressures of from atmospheric to slightly superatmospheric are generally sufficient to obtain the desired effects. In thus specifying the preferred reaction conditions, it is not intended to unduly restrict the range of operable alkylating conditions in strict accordance with the generally narrow limits specified for the preferred conditions, and it may be preferable under particular circumstances to operate beyond these ranges such as, for example, an increase of the temperature for shorter residence periods in combination with a sulfuric acid catalyst of higher concentration.

Hydrogen fluoride of from about 90 to 100 per cent concentration is also used as catalyst for alkylating a benzene hydrocarbon with a monoolefinic hydrocarbon containing from about 10 to about 16 carbon atoms per molecule. The range of temperatures employed when utilizing hydrogen fluoride as catalyst may be broader than that used with sulfuric acid catalyst, and is preferably from about −30° to about 40° C. Used hydrogen fluoride catalyst is separated from the alkylation reaction products and all or a portion of said used hydrogen fluoride catalyst may be recycled to the alkylation stage of the process.

Among the other alkylation catalysts which may be employed are boron fluoride, aluminum chloride, and the hydrocarbon (sludge) complexes, or the "ansolvo" acid complexes of each, with or without a hydrogen halide promoter such as hydrogen chloride when utilizing aluminum chloride as catalyst. Generally the anhydrous salt is preferred when employing an aluminum halide, the temperature is maintained during alkylation usually within the range of from about 0° to about 100° C., the pressure is, in general, superatmospheric, and the proportion of aluminum halide catalyst to hydrocarbons charged to the reactor is maintained at from about 0.1:1.0 to about a 1:1 ratio, although higher ratios, up to about 3:1, may be utilized in some instances.

The sulfonation stage of the process is generally carried out by contacting the alkyl aromatic hydrocarbon formed in the proceeding alkylation stage with sulfuric acid under suitable sulfonating conditions. Sulfonation is obtained usually with an acid of about 80 to about 115 per cent concentration, but preferably an acid of a concentration above about 95 per cent is selected for this purpose. A reaction temperature of from about 10° to about 80° C., but preferably of about 20° to about 50° C., and a residence time generally of less than two hours is sufficient to accomplish substantially complete sulfonation. The acid may be of the same concentration as that employed in the alkylation stage with additional sulfuric acid of higher or lower concentration being added to adjust its strength to correspond to the other conditions employed in the process or to effect otherwise more complete or satisfactory sulfonation. When utilizing the same acid in the sulfonation stage as that used in the alkylation stage, the sulfonation reaction may be accomplished in the same set of reactors to form a batch type of operation. If, on the other hand, it is desired to operate the process on a continuous basis, the reaction mixture of alkylated aromatic hydrocarbon and sulfuric acid may be transferred progressively and continuously to another zone of the same reactor where the temperature may be higher, or the mixture may be transferred to another reactor where conditions more favorable to sulfonation are maintained.

The bases which in the form of their aqueous solutions are utilizable as neutralizing agents and which supply the cation portion of the alkyl aromatic sulfonate salts comprise, in general, the alkali metal hydroxides, ammonia, organic amino compounds, etc. Of the alkali metal hydroxides, sodium hydroxide, or potassium hydroxide in aqueous solutions having concentrations up to about 30% are the preferred neutralizing agents. Ammonium sulfonates of certain alkyl aromatic derivatives formed by reacting an aqueous solution of ammonium hydroxide with the sulfonic acid are highly effective detergents and surface active agents. If an organic amino compound is to be utilized in the process as we have outlined, it is preferred that it be soluble in water to such an extent that relatively concentrated aqueous solutions of the organic amine may be used. The preferred amine is one whose sulfonic acid salt is readily soluble in aqueous solutions so that it may be utilizable for purposes in which detergents are commonly employed. The amines of this type comprise, in general, the short chain aliphatic amines such as methyl amine, ethyl amine, or propyl amine; or the hydroxy amines, such as ethanol or di-ethanol amine.

Although, our process may be carried out in batch type operation as hereinabove set forth, we prefer to carry out the process continuously. One continuous type of operation which may thus be employed comprises the cooperative series of steps illustrated in the attached diagrammatic drawing. In carrying out our process using, for example, a molar excess of toluene to naphtha fraction boiling (in case of the alkylation of toluene) within the range of from about 175° to 210° C. as starting materials, toluene is introduced through line 1 wherein it is commingled with said naphtha fraction containing from 10 to 16 carbon atoms per molecule added through line 2, and an alkylating catalyst, such as 98% sulfuric acid, is admitted through line 3. If a specially prepared naphtha fraction of the above boiling range containing olefinic hydrocarbons of 10 to 16 carbon atoms per molecule is employed, the naphtha fraction is given a solvent extraction treatment or is contacted with a selective adsorbent prior to being mixed with said alkylation catalyst and toluene, thereby removing from the olefinic fraction any undesirable components contained therein and hereinbefore identified before alkylation takes place. The solvent extraction or adsorbent treatment referred to above is not illustrated in the attached diagram, but comprises a feature of this invention whereby superior detergents may be ultimately produced. Although not illustrated on the diagram, the solvent extraction or adsorption zone may comprise one or a number of towers arranged in such a manner that a selected solvent may be contracted with the naphtha fraction, preferably by countercurrent flow. In an alternative method of utilizing a solid adsorbent such as activated silica, the naphtha fraction may be allowed to flow through a bed of the adsorbent material until the naphtha fraction has received the desired degree of purification. Moreover, such processes may be intermittent with regeneration to effect reactivation of the adsorbent material.

The mixture of toluene, naphtha fraction, and catalyst is directed to alkylation zone 4 provided with suitable agitating means and maintained at a temperature necessary to effect alkylation of toluene with the olefinic hydrocarbons contained in the said naphtha fraction. The resultant reaction mixture is removed from alkylating zone 4 through line 5 to settling zone 6 from which spent catalyst is discharged through line 7. When desired a portion of used catalyst, which is discharged through line 7, may be recycled therefrom through line 8 and line 3 to further use in alkylating zone 4. The reaction mixture comprising alkylated toluene hydrocarbons may be passed through line 9 to separating zone 10 in which the hydrocarbon layer removed from settling zone 6 is further separated into desirable fractions suitable for subsequent sulfonation. Said separating zone 10 in a preferred method of operation may comprise a fractional distillation apparatus to separate from the alkylated hydrocarbons certain fractions of desirable boiling range, specific gravity and refractive index. Undesirable hydrocarbons and foreign organic compounds boiling below or above the boiling range of the desired compounds are removed through line 11 to storage, for fuel, to a plant not illustrated on the drawing for manufacturing by-products or for other uses as desired. The fractions removed in separating zone 10 through line 11 may also contain unalkylated hydrocarbons, especially when an excess of the aromatic hydrocarbon is employed in the alkylation step, according to the preferred method of operation. Said aromatic hydrocarbons and unreacted olefinic naphtha fraction, if not completely consumed in alkylation, may be distilled from the effluent in line 11 at their respective boiling points and recycled to the alkylation reactor if desired. The fractionation zone may be preceded by a suitable solvent extraction zone, such as an apparatus for washing hydrocarbons with water or with dilute caustic or acid solutions, wherein nitrogen- and sulfur-containing compounds are removed from said hydrocarbons. When hydrogen fluoride is employed as the alkylation catalyst, the resultant hydrocarbon alkylate usually contains alkyl fluorides in very minute amounts which are preferably removed before sulfonation. This purpose may be accomplished by passing the hydrocarbons over suitable defluorinating agents such as aluminum, iron, copper, or certain oxides such as alumina at reaction temperatures (which generally may be from about 100° to about 250° C.). Although, separation zone 10 is indicated as an alternative procedure in the present invention, it is nevertheless, a preferred method of operation, especially when the naphtha fraction utilized in the prior alkylation step has not received a purification treatment for the removal of undesirable components therefrom. A particularly preferred treatment of the alkylate comprises defluorination or desulfurization of the alkylate, depending upon whether hydrogen fluoride or sulfuric acid is employed as alkylation catalyst, followed by fractionation to separate a distillate having the desired boiling range and finally water-washing the desired distillate prior to sulfonation.

The selected fraction removed from separating zone 10 after receiving the above treatment, is directed through line 12 connecting with line 13 which supplies sulfonating zone 14. Sulfuric acid of sufficient quantity for the sulfonating treatment is introduced through line 15 and line 13 to sulfonating zone 14 which is maintained at a temperature from about 10° to about 80° C. for a time sufficient to convert alkyl aromatic hydrocarbons into the corresponding sulfonic acids.

The sulfonation reaction mixture is withdrawn from sulfonating zone 14 through line 16 to settling zone 17 in which used sulfuric acid and unconverted hydrocarbons are separated from the alkyl aromatic sulfonic acid produced in zone 14. Water or spent acid may be added through line 18 and 16 to settling zone 17 to promote the separation of a middle sulfonic acid layer. From settling zone 17 a mixture of unsulfonated hydrocarbons is discharged through line 19 to storage or the mixture may be transferred to a fractionating zone not shown on the diagram wherein the hydrocarbons may be separated into specific fractions for recycling purposes. The hydrocarbon layer may, in an alternative procedure, be washed with water or an aqueous solution of an alkali before being transferred to the fractionating zone. In the fractionating zone hydrocarbons boiling lower than about 250° C. are discharged from the process or recycled to alkylation zone 4 for further treatment therein, while hydrocarbons boiling from about 250° to about 400° C. are preferably recycled to sulfonating zone 14, thus making it possible to increase the overall yield of the process.

The spent sulfuric acid from sulfonating zone 14 is removed through line 20 and directed into contacting zone 21 wherein a precipitation diluent, such as benzene or chloroform, introduced into said contacting zone through line 22 is mixed with said spent sulfuric acid to remove therefrom the sulfonic acids which usually dissolve in the spent acid to some extent during sulfonation. Contacting zone 21 may comprise a batch type apparatus for mixing the precipitation diluent with the spent sulfuric acid, or if a continuous method is desired, the contacting zone may comprise a countercurrent extraction apparatus wherein the sulfonic acid is contacted with a precipitation diluent in which it preferentially dissolves. A mixture of precipitation diluent and spent sulfuric acid is withdrawn from contacting zone 21 through line 23 and discharged into settling zone 24. In said settling zone 24 a sulfuric acid layer separates which is discharged through line 25 leaving a layer of precipitation diluent containing dissolved therein the desired sulfonic acid. The latter layer is removed from settling zone 24 through line 26 and is discharged into contacting zone 27 by connection of line 26 with line 28. The sulfonic acid layer separated in settling zone 17 is removed through line 28 and is also discharged into contacting zone 27 where the sulfonic acid is contacted with the precipitation diluent referred to above, and previously utilized in recovering the sulfonic acid contained in the spent sulfuric acid. By contacting the sulfonic acid layer with the precipitation diluent, the desired sulfonic acid product is preferentially dissolved therein, while any sulfuric acid contained in the sulfonic acid layer from settling zone 17 is precipitated from the resulting mixture. In thus employing two successive treating operations, a single charge of precipitation diluent is advantageously utilized to recover not only the sulfonic acid contained in the spent sulfuric acid, which would otherwise be lost when the acid is discharged from the process, but the sulfonic acid is also freed of substantially all of the contaminating sulfuric acid dissolved therein—a factor which reduces the cost of the subsequent neutralization step. The mixture of two phases is withdrawn from contacting zone 27 through line 29 and transferred to settling zone 30 wherein two layers form, an upper sulfonic acid layer (diluted with the precipitation diluent) and a lower aqueous sulfuric acid layer, the latter being removed from the process through line 31 and line 25. The solution of precipitation diluent and sulfonic acid is withdrawn from settling zone 30 through line 32 and is either passed through line 33 and line 34 directly into neutralizing zone 35 or may be discharged from line 32 into separating zone 36. In separating zone 36 the precipitation diluent is removed from the sulfonic acid by evaporation or distillation and in such case the diluent is removed through line 37, connecting with line 22 for recycling into the process. The sulfonic acid residue remaining in separating zone 36 is then removed through line 34 and passed into neutralizing zone 35. The preferred method of operating the present process, however, is to by-pass separating zone 36 and transfer the solution of sulfonic acid and precipitation diluent from settling zone 30 through line 33 and 34 directly into neutralizing zone 35. A suitable base, such as an aqueous solution of sodium hydroxide or ammonium hydroxide, is introduced through lines 38 and 34 into neutralizing zone 35 to convert the alkyl aromatic sulfonic acids into salts thereof. The neutralized mixture is directed from neutralizing zone 35 through line 39 to settling zone 40 in which the precipitation diluent is separated as an upper layer from the aqueous solution of the salt of the alkyl aromatic sulfonic acid. The separated precipitant diluent is recycled from settling zone 40 through line 41, 37, and 22 to contacting zone 21, already mentioned. Before recycling the precipitant diluent, at least a portion of said diluent may be fractionated to remove high boiling unsulfonated hydrocarbons which may be dissolved therein when the diluent is contacted with the sulfonic acid layer in the previous operation. The aqueous solution of the water-soluble salts of alkyl aromatic sulfonic acids is discharged from settling zone 40 through line 42 to drying zone 43, the latter comprising a suitable means for concentrating the aqueous solution of said salt. Just prior to entering the drying zone, the aqueous solution may be submitted to a partial distillation to recover solubilized precipitation diluent, which procedure is not indicated on the attached diagram.

Drying zone 43 may comprise a heated vessel into which the solution is sprayed to effect evaporation of water from the aqueous solution and to form a dried residue of a salt of the alkyl aromatic sulfonic acid, the residue so produced being generally in the form of spherically shaped particles. The dried alkyl aromatic sulfonates so produced in drying zone 43 are discharged therefrom through line 44 into storage. The reactor or vessel in which the drying is effected may be heated by suitable means as by circulating therethrough gaseous combustion products including flue gas, carbon dioxide, nitrogen, etc.

Sometimes it is desirable to modify the process described above by neutralizing the mixture of alkyl benzene sulfonic acid and sulfuric acid which is directed from settling zone 17 through line 28 as hereinabove set forth. The resultant neutralized mixture thus comprises an aqueous solution containing salts of the sulfuric acid and of the alkyl aromatic sulfonic acids. For example, when sodium hydroxide is the neutralizing agent so employed, the neutralized product contains sodium sulfate and the sodium salt of the alkyl aromatic sulfonic acid in about equal portions by weight. Such a mixture of sodium sulfate and sodium alkyl aromatic sulfonates is suitable for use as a detergent and washing aid.

When used as a surface-active agent, and particularly as a soap substitute, the combination of the sodium salt with constituents which tend to enhance its activity produces a mixture which has improved detergency. The constituent which in admixture with the sulfonic salt thus acts as an assistant in its detersive action, includes compounds such as sodium sulfate, sodium benzene sulfonate, sodium carbonate, trisodium phosphate, sodium pyrophosphate, etc. Their presence with the sulfonate salt, however, is not essential to accomplish the results for which the sulfonate is designed and it is not intended to limit the utility of the compounds of the present invention by limiting their use to such combinations.

Although the method of neutralizing the mixture of alkyl aromatic sulfonic acids and sulfuric acid is sometimes used to simplify the process, it is generally more economical to remove the sulfuric acid contaminant from the alkyl aromatic sulfonic acid in zone 30 as hereinabove set forth since the sodium hydroxide generally employed in the neutralization step of the process is more expensive than is the sodium sulfate formed simultaneously with the desired sodium salt of the alkyl aromatic sulfonic acids.

The following examples are given to illustrate the preparation of particular surface active agents, but should not be construed as unduly limiting the broad scope of our invention.

*Example I*

The naphtha fraction of a thermally cracked gas oil distillate obtained from a Pennsylvania crude oil was fractionated and a fraction boiling approximately within the range of from about 180° to about 218° C. was removed. 2300 cc. of the above naphtha fraction having a bromine number of 22 and a refractive index ($n_D^{20}$) of 1.470 was extracted with approximately equal volumes of a solvent containing methyl cellosolve, (boiling point 121° C.), and 7.4 per cent water.

The extract phase was separated and was distilled through a 5-plate fractionating column to yield 200 cc. of hydrocarbon having a refractive index ($n_D^{20}$) of 1.5330.

The methyl cellosolve, separated from the extract phase was again shaken with the raffinate phase formed in the above separation and was again separated into raffinate and extract phases. Extraction layer number 2 was then distilled to obtain 115 cc. of extract hydrocarbons having a refractive index ($n_D^{20}$) of 1.5323.

After 9 such extractions, the raffinate, amounting to 1295 cc., had a refractive index ($n_D^{20}$) of 1.4554 and a bromine number of 23 and the hydrocarbons recovered from the extract phase (35 cc.) in the ninth extraction a refractive index ($n_D^{20}$) of 1.5084.

A mixture of 600 cc. of the raffinate obtained in the 9th extraction and 400 cc. of benzene was added with stirring during a period of 2¼ hours to a mixture of 400 cc. of benzene and 100 g. of hydrogen fluoride maintained at or about 0° C. with an ice bath. The mixture was stirred an additional ½ hour after which the acid layer was removed and the upper layer washed with water, dried over potassium carbonate, and defluorinated by passage over alumina at 120° C., space velocity 1.

The alkylate was fractionally distilled to remove unreacted benzene and raffinate, and the fraction boiling from 275° to 384° C. was collected.

Sulfonation of the alkylate was preceded by treatment of said alkylate (92 g.) with three 50-cc. portions of 80 per cent sulfuric acid and then four 5-cc. portions of 96 per cent sulfuric acid. The sulfonation proper was carried out by stirring the purified alkylate 2 hours at 50° C. with 133 cc. of fresh 96 per cent sulfuric acid. After cooling, two layers separated. The upper viscous layer was separated, diluted with ice, neutralized with sodium hydroxide, evaporated to dryness, and extracted with 95 per cent ethyl alcohol to yield a white granular solid on evaporation of the alcohol. The alkyl benzene sodium sulfonate possessed excellent detergency, especially in hard water.

*Example II*

Benzene was alkylated with an unextracted naphtha fraction boiling in the range of 180° to 216° C. (bromine number: 23), using hydrogen fluoride as catalyst. Six liters of benzene, and 1.5 pounds of hydrogen fluoride was added to an alkylation reaction and maintained at a temperature of about 4 to 5° C. while 3.0 liters of the above naphtha fraction were added over a period of 35 minutes. The mixture was stirred an additional 45 minutes and held at 4 to 5° C. during this period. The acid and hydrocarbon layers were separated and the latter hydrocarbon layer washed repeatedly with water until the wash water was free of acid. The resulting alkylate was then defluorinated by passage over alumina at 120° C., atmospheric pressure, and at a liquid hourly space velocity of 1.

The alkylate was then fractionally distilled to separate the hydrocarbons into desired fractions. The following fractions were obtained:

| Fraction Number | Boiling Range, °C. | Vol. of Fraction, ml. | Liquid, Vol., Percent | $n_D^{20}$ |
|---|---|---|---|---|
| 1 | 60–170 | 5,557 | 66.6 | |
| 2 | 170–206 | 2,084 | 25.0 | (Br. No.=3). |
| 3 | 206–275 | 251 | 3.16 | 1.4938. |
| 4 | 275–300 | 57.2 | 0.72 | 1.4991. |
| 5 | 300–325 | 90.5 | 1.14 | 1.5084. |
| 6 | 325–335 | 18.8 | 0.24 | 1.5181. |
| 7 | 335–345 | 35.1 | 0.44 | 1.5223. |
| 8 | 345–355 | 53.6 | 0.68 | 1.5310. |
| 9 | 355–365 | 34.0 | 0.43 | 1.5395. |
| 10 | 365–375 | 43.2 | 0.55 | 1.5465. |
| 11 | 375–390 | 24.0 | 0.30 | 1.5600. |
| Botts | | 60.0 | 0.76 | Dark Red Resinous solid. |

(A) Fractions 4 and 5 of the above distillate (boiling point 275 to 325° C.) were combined and treated at 23° C. with several 50 ml. portions of 80 per cent sulfuric acid, and several 10 ml. portions of 96 per cent sulfuric acid. Following this treatment, 2.64 g. of 96 per cent sulfuric acid per gram of alkylate was added and the mixture stirred at 50° C. for 2 hours, and allowed to cool to room temperature.

The top sulfonic acid layer of the resultant product was drained into approximately 100 g. of ice and neutralized with dilute sodium hydroxide. The solution was evaporated to dryness, and the residue extracted with 95 per cent ethanol. A nearly white granular solid material was obtained which possessed excellent hard water detersive efficiency. The yield of sulfonate salt was practically 100 per cent of theoretical yield.

(B) Fractions 6 and 7 of the above distillate (boiling range 325° to 345° C.) were combined and treated at 23° C. with 50 cc. of sulfuric acid of 50 per cent concentration for 10 minutes, with three 50 ml. portions of 80 per cent sulfuric acid for 30 minutes and with two 10 ml. portions of 96 per cent sulfuric acid for 20 minutes. Following the above treatment, the alkylate was sulfonated according to the method employed in part (A) above, yielding a sulfonate salt also having excellent detersive properties, but which possessed a slight ecru coloring. The yield of sulfonate salt was 72 per cent of the theoretical yield.

(C) Fraction 8 of the above alkylate (boiling point 345° C. to 355° C.) was given a treatment similar to those of parts (A) and (B) above and was sulfonated under similar conditions. The sulfonate salt which was obtained had a slightly darker shade of ecru than the product obtained in part (B) and exhibited a slightly lesser degree of detersive efficiency than the sulfonate of the alkylate boiling in the range of 325° to 345° C.

*Example III*

Toluene was alkylated with a naphtha fraction boiling in the range of 180° to 216° C. with hydrogen fluoride as catalyst. Three liters of the above naphtha fraction was added at 4° C., with stirring to a mixture of 6 liters of toluene and 675 grams of hydrogen fluoride over a period of 55 minutes. Following the addition of the naphtha, the mixture was stirred for 45 minutes longer.

The product was washed with water until no free acid was detected in the washings, and the hydrocarbons were defluorinated by passage over alumina at 120° C., atmospheric pressure, and at a liquid hourly space velocity of 1.

The 300° to 326° C. boiling range fraction of the alkylate (200 cc. of 300°–319° C. boiling range fraction having $n_D^{20}=1.5076$, and 64 cc. of 319° to 326° C. boiling range fraction having an $n_D^{20}=1.5160$) was placed in a reaction flask equipped with a mechanical stirrer and sulfonated with 2.71 g. of 100 per cent sulfuric acid per gram of alkylate over a 30 minute reaction period at a temperature within the range of 26° to 30°. After stirring for 2 hours and standing overnight, 2 layers separated, neither of which contained unsulfonated hydrocarbons.

The upper sulfonic acid layer was poured into ice and neutralized with dilute sodium hydroxide. The aqueous solution was evaporated leaving a nearly white salt having excellent detersive properties.

We claim as our invention:

1. A process for the production of a detergent which comprises treating a naphtha fraction which contains olefinic hydrocarbons boiling within the range of from about 160° to about 240° C. with an agent capable of removing therefrom condensed-ring aromatic hydrocarbons and nitrogen- and sulfur-containing organic compounds, alkylating a benzenoid hydrocarbon containing at least two replaceable nuclear hydrogen atoms with the thus treated naphtha fraction, separating from the resultant alkylate an alkyl aromatic hydrocarbon fraction having an alkyl group containing from about 10 to about 16 carbon atoms, sulfonating said fraction of alkylate and converting the sulfonic acid formed thereby into a sulfonate salt.

2. A process for the production of a detergent which comprises treating a naphtha fraction which contains olefinic hydrocarbons boiling within the range of from about 160° to about 240° C., with an agent capable of removing therefrom condensed-ring aromatic hydrocarbons and nitrogen- and sulfur-containing organic compounds, alkylating a benzenoid hydrocarbon containing at least two replaceable nuclear hydrogen atoms with the thus treated naphtha fraction, sulfonating the resultant alkylate, and converting the sulfonic acid formed thereby into a sulfonate salt.

3. The process defined in claim 2 further characterized in that the alkylation reaction is catalyzed by sulfuric acid containing from about 96 to about 98 per cent sulfuric acid.

4. A process for the production of a detergent which comprises alkylating a benzenoid hydrocarbon containing at least two replaceable nuclear hydrogen atoms with an olefinic naphtha fraction boiling within the range of from about 160° to about 240° C., sulfonating the resultant fractions of alkylate with sulfuric acid of about 80 to about 115 per cent concentration, removing from the sulfuric acid layer the products of said sulfonation the sulfonic acid dissolved therein, and removing from the sulfonic acid layer of the products of said sulfonation the sulfuric acid dissolved therein, combining said sulfonic acid fractions and neutralizing the same with a basic reagent to form said detergent.

5. A process for the production of a detergent which comprises alkylating a benzenoid hydrocarbon containing at least two replaceable nuclear hydrogen atoms with an olefinic naphtha fraction boiling within the range of from about 160° to about 240° C., sulfonating the resultant fractions of alkylate with sulfuric acid of about 80 to about 115 per cent concentration, contacting the sulfuric acid layer separated from the product of said sulfonation with a selective solvent for the sulfonic acid present therein, separating the resultant extract and contacting the same with the sulfonic acid layer separated from the products of said sulfonation, separating the layer containing said selective solvent and sulfonic acid dissolved therein, removing said selective solvent, and neutralizing the remaining sulfonic acid with a basic reagent to form said detergent.

6. A process for the production of a detergent which comprises alkylating a molar excess of benzene with an olefinic naphtha fraction boiling within the range of from about 160° to about 240° C. in the presence of sulfuric acid of about 93 to about 98 per cent concentration at a temperature of from about 0° to about 10° C., fractionating the resultant alkylate to obtain a fraction containing an alkyl benzene hydrocarbon in which an alkyl group of said alkyl benzene hydrocarbon contains from about 10 to about 16 carbon atoms, sulfonating said fraction with sulfuric acid of from about 80 to about 115 per cent concentration at a temperature of from about 10° to about 80° C., contacting the sulfuric acid layer separated from the product of said sulfonation with a selective solvent for the sulfonic acid present therein, separating resultant extract and contacting the same with the sulfonic acid layer separated from the products of said sulfonation, separating the layer containing said selective solvent and sulfonic acid dissolved therein, reacting said layer with an aqueous solution of a basic reagent, separating said selective solvent from the resultant aqueous solution of sulfonic acid salt, and recovering said salt.

7. The process defined in claim 6 further characterized in that said basic reagent is an aqueous solution of sodium hydroxide.

8. A process for the production of a detergent which comprises reacting benzene in the presence of an alkylating catalyst and at alkylating conditions with an olefinic naphtha fraction boiling within the range of from about 160° to about 240° C., in an amount ranging from about 2 to about 20 mols of benzene per mol of said olefinic naphtha fraction, fractionating the resultant alkylate to obtain a fraction containing an alkyl benzene hydrocarbon in which the alkyl group contains from about 10 to about 16 carbon atoms, sulfonating said fraction with sulfuric acid of from about 80 to about 115% concentration, contacting the sulfuric acid layer separated from the sulfonation product with a selective solvent for the sulfonic acid present therein, separating resultant extract and contacting the same with the sulfonic acid layer separated from the products of said sulfonation, separating a layer containing said selective solvent and sulfonic acid dissolved therein, reacting said layer with an aqueous solution of sodium hydroxide of sufficient concentration to neutralize said sulfonic acid, separating said selective solvent from the resultant aqueous solution of sodium alkyl benzene sulfonate, and recovering said sulfonate salt.

9. A process for the production of a detergent which comprises reacting toluene in the presence of an alkylating catalyst and at alkylating conditions with an olefinic naphtha fraction boiling within the range of from about 160° to about 240° C., in an amount ranging from about 2 to about 20 molecular proportions of toluene to 1 molecular proportion of said olefinic naphtha fraction, thereby reducing polyalkylation and self-alkylation of the naphtha fraction, fractionating the resultant alkylate to obtain a fraction containing an alkylated toluene hydrocarbon in which said alkyl group contains from about 10 to about 16 carbon atoms, sulfonating said fraction with sulfuric acid of from about 80 to about 115% concentration, contacting the sulfuric acid layer separated from the product of said sulfonation with a selective solvent for the sulfonic acid present therein, separating resultant extract and contacting the same with the sulfonic acid layer separated from the products of said sulfonation, separating a layer containing said selective solvent and sulfonic acid dissolved therein, reacting said layer with an aqueous solution of sodium hydroxide of sufficient concentration to neutralize said sulfonic acid, separating said selective solvent from the resultant aqueous solution of sodium alkyl toluene sulfonate, and recovering said sulfonate salt.

10. A process for the production of surface active agents which comprises treating a naphtha fraction containing olefinic hydrocarbons boiling within the range of from about 160° C. to about 240° C. to remove therefrom condensed-ring aromatic hydrocarbons and nitrogen- and sulfur-containing organic compounds; alkylating a mononuclear aromatic hydrocarbon containing at least two replaceable nuclear hydrogen atoms with the thus treated naphtha fraction; sulfonating at least a portion of the resultant alkylate with sulfuric acid of from about 80 to about 115% concentration to form an aromatic sulfonic acid; separating the resultant sulfonation products into an uppermost hydrocarbon layer, a middle layer comprising said sulfonic acid and dissolved sulfuric acid, and a lowermost layer comprising used sulfuric acid and dissolved sulfonic acid; extracting said lowermost layer with a selective solvent for the sulfonic acid present therein; separating the resultant extract and contacting the same with said middle layer to effect the separation therefrom of a separate layer of said dissolved sulfuric acid which is substantially insoluble in said extract; and separating the resultant solution of sulfonic acid and neutralizing the aromatic sulfonic acid content thereof with a basic reagent to form the corresponding aromatic sulfonic acid salt.

11. The process of claim 10 further characterized in that said naphtha fraction is extracted with an aliphatic ether of ethylene glycol.

12. The process of claim 10 further characterized in that said naphtha fraction is extracted with a nitroparaffin.

13. The process of claim 10 further characterized in that said lowermost layer is extracted with benzene.

14. The process of claim 10 further characterized in that said lowermost layer is extracted with chloroform.

15. A process for the production of surface active agents which comprises alkylating a mononuclear aromatic hydrocarbon containing at least two replaceable nuclear hydrogen atoms with a naphtha fraction containing olefinic hydrocarbons boiling in the range of from about 160° C. to about 240° C.; sulfonating at least a portion of the resultant alkylate with sulfuric acid of from about 80 to about 115% concentration to form an aromatic sulfonic acid; separating the resultant sulfonation products into an uppermost hydrocarbon layer, a middle layer comprising said sulfonic acid and dissolved sulfuric acid, and a lowermost layer comprising used sulfuric acid and dissolved sulfonic acid; extracting said lowermost layer with a selective solvent for the sulfonic acid present therein; separating the resultant extract and contacting the same with said middle layer to effect the separation therefrom of a separate layer of said dissolved sulfuric acid which is substantially insoluble in said extract; and separating the resultant solution of sulfonic acid and neutralizing the aromatic sulfonic acid content thereof with a basic reagent to form the corresponding aromatic sulfonic acid salt.

BERNARD S. FRIEDMAN.
GEORGE L. HERVERT.

REFERENCES CITED

The following references are of record in the file of this patent:

UNITED STATES PATENTS

| Number | Name | Date |
| --- | --- | --- |
| 2,330,922 | Riegler | Oct. 5, 1943 |
| 2,340,654 | Flett | Feb. 1, 1944 |
| 2,364,782 | Flett | Dec. 12, 1944 |

FOREIGN PATENTS

| Number | Country | Date |
| --- | --- | --- |
| 75,550 | Switzerland | Jan. 2, 1918 |
| 766,903 | France | Apr. 23, 1934 |